United States Patent
Narikawa

(10) Patent No.: US 8,979,278 B2
(45) Date of Patent: Mar. 17, 2015

(54) LIGHT SOURCE DEVICE AND PROJECTION APPARATUS WHICH ADJUSTS A LIGHT EMISSION STATE OF FIRST AND SECOND LIGHT SOURCES BASED ON ONE OF DETECTED LIGHT INTENSITY VALUES AND AN ACCUMULATED LIGHT EMISSION TIME, AND PROJECTION METHOD AND NON-TRANSITORY STORAGE MEDIUM

(75) Inventor: Tetsuro Narikawa, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 198 days.

(21) Appl. No.: 12/840,496

(22) Filed: Jul. 21, 2010

(65) Prior Publication Data

US 2011/0043764 A1    Feb. 24, 2011

(30) Foreign Application Priority Data

Aug. 21, 2009    (JP) ................. 2009-192595

(51) Int. Cl.
*G03B 21/14*    (2006.01)
*G03B 21/20*    (2006.01)
(Continued)

(52) U.S. Cl.
CPC .......... *G03B 21/2013* (2013.01); *G03B 21/204* (2013.01); *G03B 33/12* (2013.01);
(Continued)

(58) Field of Classification Search
CPC ..... G03B 21/28; H04N 9/3182; H04N 9/3194
USPC .............................. 353/85, 94, 98
See application file for complete search history.

(56) References Cited

U.S. PATENT DOCUMENTS 6,634,757 B2 * 10/2003 Asakawa .................... 353/85
7,273,286 B2    9/2007 Ikebe et al.
(Continued)

FOREIGN PATENT DOCUMENTS

JP    2003-005714 A    1/2003
JP    2003-263902 A    9/2003
(Continued)

OTHER PUBLICATIONS

Japanese Office Action (and English translation) dated Feb. 5, 2013, which issued in counterpart Japanese Application No. 2009-192595.
(Continued)

*Primary Examiner* — Sultan Chowdhury
*Assistant Examiner* — Bao-Luan Le
(74) *Attorney, Agent, or Firm* — Holtz, Holtz, Goodman & Chick PC

(57) ABSTRACT

A first light source control section controls the drive timing of each of the first and second light sources, and light-source light generation section such that the light-source light generated from each of the light-source light generation section and second light source is cyclically generated. A detection section detects the light intensity of the light-source light generated from each of the light-source light generation section and second light source. A storage section stores therein the light intensity value of the light-source light generated from each of the light-source light generation section and second light source detected by the detection section. A second light source control section adjusts the light emission state of each of the first and second light sources on the basis of the detection results of the detection section with respect to the light-source light intensity values stored in the storage section.

17 Claims, 8 Drawing Sheets

(51) Int. Cl.
*G03B 33/12* (2006.01)
*G09G 3/00* (2006.01)
*G09G 3/34* (2006.01)
*H04N 5/14* (2006.01)

(52) U.S. Cl.
CPC ............ *G09G 3/001* (2013.01); *G09G 3/3413* (2013.01); *H04N 5/145* (2013.01); *G03B 21/2053* (2013.01); *G09G 3/006* (2013.01); *G09G 2310/0235* (2013.01); *G09G 2320/048* (2013.01); *G09G 2320/0606* (2013.01); *G09G 2320/0666* (2013.01); *G09G 2320/0693* (2013.01); *G09G 2320/08* (2013.01); *G09G 2330/027* (2013.01); *G09G 2340/14* (2013.01); *G09G 2360/145* (2013.01)
USPC .............................................. 353/85; 353/94

(56) References Cited

U.S. PATENT DOCUMENTS

| 7,322,703 | B2 | 1/2008 | Matsui |
| 8,425,052 | B2 | 4/2013 | Peeters et al. |
| 2005/0162619 | A1* | 7/2005 | Hamaya .................. 353/69 |
| 2006/0170883 | A1* | 8/2006 | Matsui .................. 353/85 |
| 2006/0279710 | A1* | 12/2006 | Tani .................. 353/85 |
| 2008/0218704 | A1* | 9/2008 | Yagyu .................. 353/98 |
| 2009/0034284 | A1* | 2/2009 | Li et al. .................. 362/554 |

FOREIGN PATENT DOCUMENTS

| JP | 2004-341105 A | 12/2004 |
| JP | 2005-353890 A | 12/2005 |
| JP | 2006-023436 A | 1/2006 |
| JP | 2008-538145 A | 10/2008 |
| JP | 2009-053321 A | 3/2009 |
| WO | WO 2007/141688 A1 | 12/2007 |
| WO | WO 2009/069010 A1 | 6/2009 |

OTHER PUBLICATIONS

Japanese Office Action dated Feb. 4, 2014 (and English translation thereof) in counterpart Japanese Application No. 2013-079066.

Japanese Office Action dated Feb. 25, 2014 (and English translation thereof) in counterpart Japanese Application No. 2013-079067.

* cited by examiner

LIGHT SOURCE DEVICE AND PROJECTION APPARATUS WHICH ADJUSTS A LIGHT EMISSION STATE OF FIRST AND SECOND LIGHT SOURCES BASED ON ONE OF DETECTED LIGHT INTENSITY VALUES AND AN ACCUMULATED LIGHT EMISSION TIME, AND PROJECTION METHOD AND NON-TRANSITORY STORAGE MEDIUM

CROSS-REFERENCE TO RELATED APPLICATIONS

This application is based upon and claims the benefit of priority from prior Japanese Patent Application No. 2009-192595, filed Aug. 21, 2009, the entire contents of which are incorporated herein by reference.

BACKGROUND OF THE INVENTION

1. Field of the Invention

The present invention relates to a light source device, projection apparatus, projection method, and storage medium suitable for a projector apparatus, and the like.

2. Description of the Related Art

For example, in Jpn. Pat. Appln. KOKAI Publication No. 2004-341105 (hereinafter, Document 1), a technique is contrived in which a light-emitting diode emitting ultraviolet light is used as a light source, a visible light reflection film having characteristics of transmitting ultraviolet light, and reflecting visible light is formed on a surface of a color wheel irradiated with ultraviolet light from the light-emitting diode on the light source side, and a fluorescent substance layer emitting visible light corresponding to each of red, green, and blue by ultraviolet light irradiation is formed on the back surface side of the color wheel.

However, when the technique described in the above Document 1 is employed as it is, each of various types of the red fluorescent substance known at present is considerably lower in luminous efficiency than the other green fluorescent substance and blue fluorescent substance.

As a result of this, when priority is given to the luminance in order to acquire a bright projection image, there is the drawback that the luminance of red becomes insufficient, the white balance is lost, and the color reproducibility is lowered. On the other hand, when importance is attached to the white balance, and the emission period of red having the low luminance is made longer than the emission period of the other green or blue, there has been the problem that the overall luminance is lowered, thereby leading to a dark image.

Even when the configuration in which only the red emission is replaced with a LED light source is employed, the emission efficiency is similarly low, and thus the above drawback still exists.

BRIEF SUMMARY OF THE INVENTION

Accordingly, it is an object of the present invention to make the color reproducibility and luminosity of the projected image compatible with each other for a long time by carrying out compensation even if aged deterioration occurs in the individual elements, and the like when a plurality of light sources, fluorescent substances or the like are used.

According to one aspect of the present invention, there is provided a light source device comprising: a first light source configured to emit light in a first wavelength range; a light-source light generation section configured to generate light-source light of each of a plurality of colors by using the light emission of the first light source by time division; a second light source configured to emit light-source light of a second wavelength range different from the first wavelength range; a first light source control section configured to control the drive timing of each of the first and second light sources, and light-source light generation section such that the light-source light generated from each of the light-source light generation section and second light source is cyclically generated; a detection section configured to detect the light intensity of the light-source light generated from each of the light-source light generation section and second light source; a storage section configured to store therein the light intensity value of the light-source light generated from each of the light-source light generation section and second light source detected by the detection section; and a second light source control section configured to adjust the light emission state of each of the first and second light sources on the basis of the detection results of the detection section with respect to the light-source light intensity values stored in the storage section.

According to one aspect of the present invention, there is provided a light source device comprising: a first light source configured to emit light in a first wavelength range; a light-source light generation section configured to generate light-source light of each of a plurality of colors by using the light emission of the first light source by time division; a second light source configured to emit light-source light of a second wavelength range different from the first wavelength range; a first light source control section configured to control the drive timing of each of the first and second light sources, and light-source light generation section such that the light-source light generated from each of the light-source light generation section and second light source is cyclically generated; a time counting section configured to count the accumulated light emission time of at least one of the first and second light sources; and a second light source control section configured to adjust the light emission state of at least one of the first and second light sources on the basis of the time counting result of the time counting section.

According to one aspect of the present invention, there is provided a projection apparatus comprising: a first light source configured to emit light in a first wavelength range; a light-source light generation section configured to generate light-source light of each of a plurality of colors by using the light emission of the first light source by time division; a second light source configured to emit light-source light of a second wavelength range different from the first wavelength range; a first light source control section configured to control the drive timing of each of the first and second light sources, and light-source light generation section such that the light-source light generated from each of the light-source light generation section and second light source is cyclically generated; a detection section configured to detect the light intensity of the light-source light generated from each of the light-source light generation section and second light source; a storage section configured to store therein a predetermined light intensity value of the light-source light generated from each of the light-source light generation section and second light source detected by the detection section; a second light source control section configured to adjust the light emission state of each of the first and second light sources on the basis of the detection results of the detection section with respect to the light-source light intensity values stored in the storage section; an input section configured to input an image signal; and a projection section configured to form a color light figure corresponding to the image signal input by the input section by using the light-source light emitted on the basis of the control carried out in each of the first and second light source control sections, and project the formed color light figure.

According to one aspect of the present invention, there is provided a projection apparatus comprising: a first light source configured to emit light in a first wavelength range; a light-source light generation section configured to generate light-source light of each of a plurality of colors by using the light emission of the first light source by time division; a second light source configured to emit light-source light of a second wavelength range different from the first wavelength range; a first light source control section configured to control the drive timing of each of the first and second light sources, and light-source light generation section such that the light-source light generated from each of the light-source light generation section and second light source is cyclically generated; a time counting section configured to count the accumulated light emission time of at least one of the first and second light sources; a second light source control section configured to adjust the light emission state of at least one of the first and second light sources on the basis of the time counting result of the time counting section; an input section configured to input an image signal; and a projection section configured to form a color light figure corresponding to the image signal input by the input section by using the light-source light emitted on the basis of the control carried out in each of the first and second light source control sections, and project the formed color light figure.

According to one aspect of the present invention, there is provided a projection method for a projection apparatus including a first light source configured to emit light in a first wavelength range, a light-source light generation section configured to generate light-source light of each of a plurality of colors by using the light emission of the first light source by time division, a second light source configured to emit light-source light of a second wavelength range different from the first wavelength range, a detection section configured to detect the light intensity of the light-source light generated from each of the light-source light generation section and second light source, a storage section configured to store therein a predetermined light intensity value of the light-source light generated from each of the light-source light generation section and second light source detected by the detection section, an input section configured to input an image signal, and a projection section configured to form a color light figure corresponding to the image signal input by the input section by using the light-source light, and project the formed color light figure, the method comprising: controlling the drive timing of each of the first and second light sources, and light-source light generation section such that the light-source light generated from each of the light-source light generation section and second light source is cyclically generated; and adjusting the light emission state of each of the first and second light sources on the basis of the detection results of the detection section, and light-source light intensity values stored in the storage section.

According to one aspect of the present invention, there is provided a projection method for a projection apparatus including a first light source configured to emit light in a first wavelength range, a light-source light generation section configured to generate light-source light of each of a plurality of colors by using the light emission of the first light source by time division, a second light source configured to emit light-source light of a second wavelength range different from the first wavelength range, a time counting section configured to count the accumulated light emission time of at least one of the first and second light sources, an input section configured to input an image signal, and a projection section configured to form a color light figure corresponding to the image signal input by the input section by using the light-source light, and project the formed color light figure, the method comprising: controlling the drive timing of each of the first and second light sources, and light-source light generation section such that the light-source light generated from each of the light-source light generation section and second light source is cyclically generated; and adjusting the light emission state of at least one of the first and second light sources on the basis of the time counting result of the time counting section.

According to one aspect of the present invention, there is provided a storage medium storing computer-executable program code for a projection apparatus including a first light source configured to emit light in a first wavelength range, a light-source light generation section configured to generate light-source light of each of a plurality of colors by using the light emission of the first light source by time division, a second light source configured to emit light-source light of a second wavelength range different from the first wavelength range, a detection section configured to detect the light intensity of the light-source light generated from each of the light-source light generation section and second light source, a storage section configured to store therein a predetermined light intensity value of the light-source light generated from each of the light-source light generation section and second light source detected by the detection section, an input section configured to input an image signal, and a projection section configured to form a color light figure corresponding to the image signal input by the input section by using the light-source light, and project the formed color light figure, the program code comprising: controlling the drive timing of each of the first and second light sources, and light-source light generation section such that the light-source light generated from each of the light-source light generation section and second light source is cyclically generated; and adjusting the light emission state of each of the first and second light sources on the basis of the detection results of the detection section, and light-source light intensity values stored in the storage section is recorded.

According to one aspect of the present invention, there is provided a storage medium storing computer-executable program code for a projection apparatus including a first light source configured to emit light in a first wavelength range, a light-source light generation section configured to generate light-source light of each of a plurality of colors by using the light emission of the first light source by time division, a second light source configured to emit light-source light of a second wavelength range different from the first wavelength range, a time counting section configured to count the accumulated light emission time of at least one of the first and second light sources, an input section configured to input an image signal, and a projection section configured to form a color light figure corresponding to the image signal input by the input section by using the light-source light, and project the formed color light figure, the program code comprising: controlling the drive timing of each of the first and second light sources, and light-source light generation section such that the light-source light generated from each of the light-source light generation section and second light source is cyclically generated; and adjusting the light emission state of at least one of the first and second light sources on the basis of the time counting result of the time counting section is recorded.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be described below with reference to the drawings.

First Embodiment

A first embodiment of a case where the present invention is applied to a data projector apparatus of the DLP (registered trade name) system will be described below with reference to the drawings.

Figure 1:
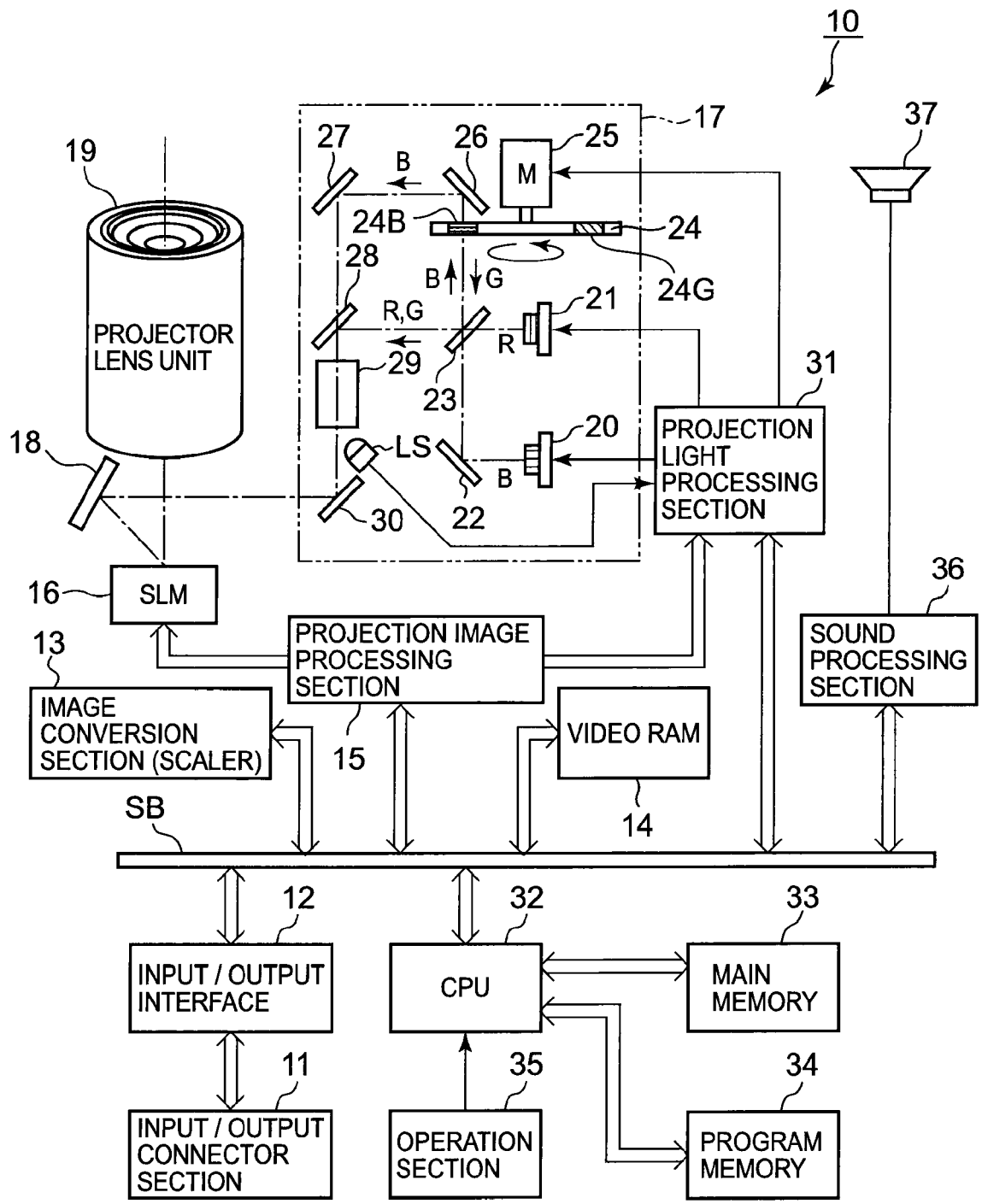
FIG. 1 is a block diagram showing the functional circuit configuration of an overall data projector apparatus according to a first embodiment of the present invention.

FIG. 1 is a block diagram showing the schematic functional configuration of an electronic circuit provided in a data projector apparatus 10 according to this embodiment.

A reference symbol 11 denotes an input/output connector section including, for example, a pin-jack (RCA) type video input terminal, D-sub 15 type RGB input terminal, and Universal Serial Bus (USB) connector.

Image signals of various standards to be input from the input/output connector section 11 are input to an image conversion section 13 through an input/output interface (I/F) 12, and system bus SB.

The image conversion section 13 unifies the input image signals into image signals of a predetermined format suitable for projection, appropriately writes the image signals onto a video RAM 14 which is a buffer memory, thereafter reads the written image signals, and transmits the read image signals to a projection image processing section 15.

At this time, data such as symbols or the like indicating various operational states for On Screen Display (OSD) are processed to be superimposed on the image signals in the video RAM 14 as the need arises, and the processed image signals are read and transmitted to the projection image processing section 15.

The projection image processing section 15 display-drives a micromirror element 16 which is a spatial light modulation (SLM) element by time-division drive of higher speed obtained by multiplying a frame rate conforming to a predetermined format, for example, 120 frames/second by a division number of color components, and display gradation number in accordance with image signals transmitted thereto.

The micromirror element 16 forms a light figure by the light reflected therefrom by individually subjecting each of inclination angles of a plurality of minute mirrors arranged in an array corresponding to, for example, XGA (1024 lateral pixels×768 vertical pixels) to an on/off operation at high speed.

On the other hand, primary-color light components of red, green, and blue are cyclically emitted from a light source section 17 by time division. Each of the primary-color light components of red, green, and blue from the light source section 17 is reflected from a mirror 18, and is applied to the micromirror element 16.

Further, a light figure is formed by the reflected light of the micromirror element 16, the formed light figure is transmitted through a projector lens unit 19, and is projection-displayed on a screen (not shown) which is a projection object.

The light source section 17 the specific optical configuration of which will be described later, includes two types of light sources, i.e., a semiconductor laser 20 emitting blue laser light, and LED 21 emitting red light.

The blue laser light emitted from the semiconductor laser 20 is reflected from a mirror 22, is thereafter transmitted through a dichroic mirror 23, and is then applied to one point on the circumference of a color wheel 24. The color wheel 24 is rotated by a motor 25 basically at a constant speed. On the circumference of the color wheel 14 irradiated with the laser light, a green fluorescent substance reflection plate 24G and blue color diffusion plate 24B are jointly formed into a ring-like shape.

When the green fluorescent substance reflection plate 24G is located at the irradiation position of the laser light, green light is excited by the irradiation of the laser light, the excited green light is reflected from the color wheel 24, and is thereafter reflected also from the dichroic mirror 23. Thereafter, the green light is reflected from a dichroic mirror 28, formed into a light flux having substantially uniform luminance distribution by an integrator 29, is thereafter reflected from a mirror 30, and is then sent to the mirror 18.

Further, when the blue color diffusion plate 24B of the color wheel 24 is located at the irradiation position of the laser light as shown in FIG. 1, the laser light is transmitted through the color wheel 24 while being diffused by the diffusion plate 24B, and is thereafter reflected from each of mirrors 26 and 27. Thereafter, the blue light is transmitted through the dichroic mirror, is formed into a light flux having substantially uniform luminance distribution by the integrator 29, is thereafter reflected from the mirror 30, and is then sent to the mirror 18.

Furthermore, the red light emitted from the LED 21 is transmitted through the dichroic mirror 23, is thereafter reflected from the dichroic mirror 28, is formed into a light flux having substantially uniform luminance distribution by the integrator 29, is thereafter reflected from the mirror 30, and is then sent to the mirror 18.

As described above, the dichroic mirror 23 has the spectral characteristics of transmitting the blue light and red light therethrough, whereas reflecting the green light.

Further, the dichroic mirror 28 has the spectral characteristics of transmitting the blue light, whereas reflecting the red light and green light.

Furthermore, a light sensor LS is arranged to be directed to the outgoing-light side of the integrator 29. The light sensor LS detects only the luminance of light irrespectively of the color of the light, and the detection output thereof is output to a projection light processing section 31.

Each light emission timing and emission intensity of each of the semiconductor laser 20 and LED 21 of the light source section 17, rotation of the color wheel 24 carried out by the motor 25, and detection of light carried out by the light sensor LS are controlled by the projection light processing section 31. A timing signal of the image data is given to the projection light processing section 31 from the projection image processing section 15.

The projection light processing section 31 executes control of each light emission timing and emission intensity of each of the semiconductor laser 20 and LED 21 constituting the light source section 17, rotation of the color wheel 24 carried out by the motor 25, and detection of light carried out by the light sensor LS under the integrated control of a CPU 32 to be described later.

The CPU 32 executes a control operation in the data projector apparatus 10 by using a main memory 33 constituted of a DRAM, and program memory 34 constituted of an electrically rewritable nonvolatile memory in which an operation program and various standardized data items are stored.

The CPU 32 executes various projection operations in accordance with key operation signals from an operation section 35.

The operation section 35 includes a key operation section provided on the main body of the data projector apparatus 10, and laser reception section configured to receive infrared light from a remote controller (not shown) to be exclusively used for the data projector apparatus 10, and directly outputs a key operation signal based on the key operated by the user by using the key operation section of the main body or the remote controller to the CPU 32.

The operation section 35 is provided with, together with the above-mentioned key operation section and remote controller, for example, a focus adjustment key (FOCUS), zoom adjustment key (ZOOM), input image switching key (INPUT), menu key (MENU), cursor (←, →, ↑, and ↓) key, set key (ENTER), cancel key (ESC), and the like.

In the program memory 34, each of the drive current values of the LED 21 and semiconductor laser 20 at the time of emission of each of the red, green, and blue light components in a state where the white balance is obtained at the time of shipment from the factory is fixedly stored as the rated current value, in addition to the above-mentioned operation program and various setting data items.

The CPU 32 described above is further connected also to a sound processing section 36 through the system bus SB. The sound processing section 36 is provided with a sound source circuit such as a PCM sound source or the like, converts the sound data input at the time of the projection operation into analog data, drives a speaker section 37 to loudspeaker-release the sound or generate beep sound as the need arises.

Figure 2:
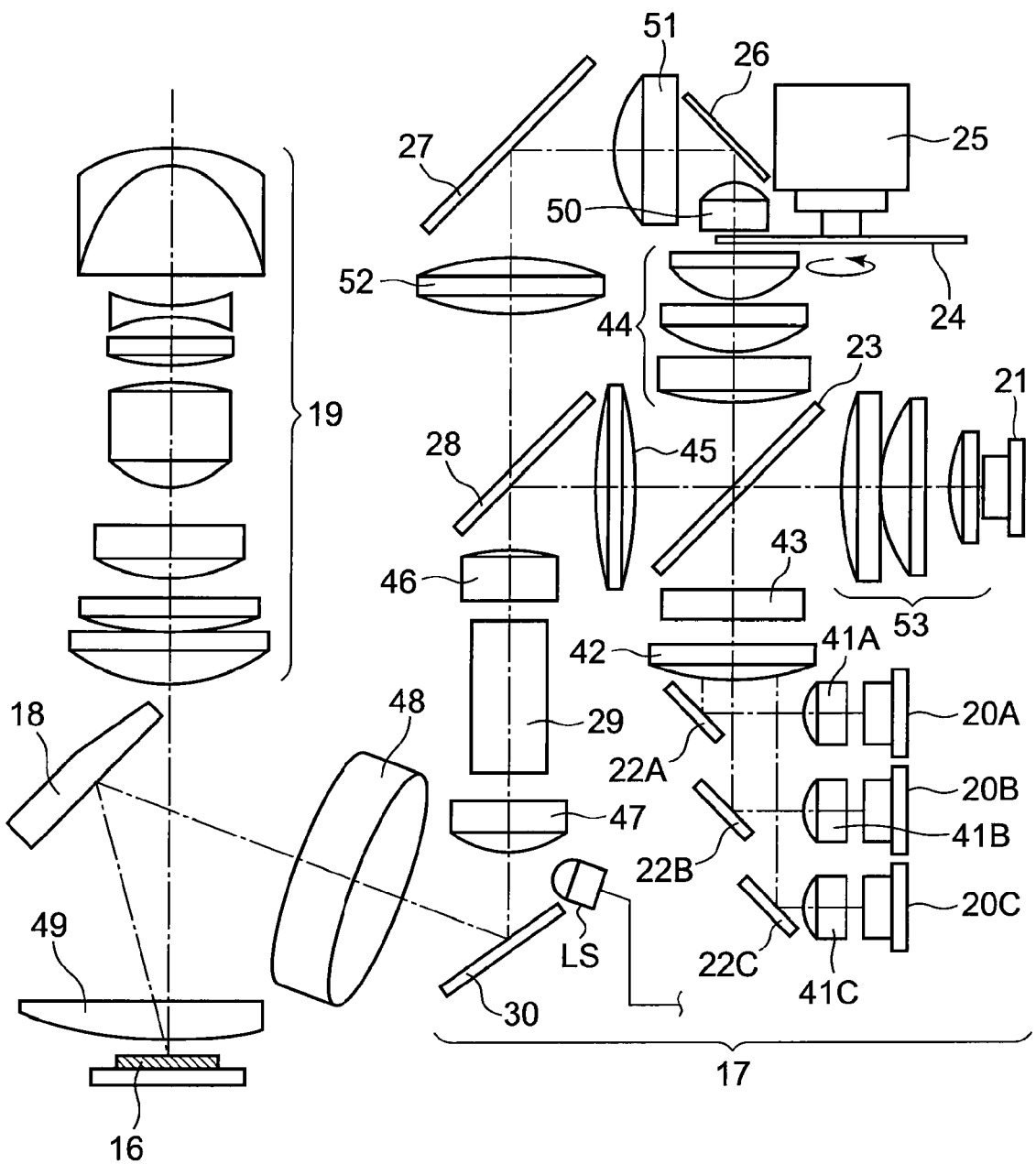
FIG. 2 is a view mainly showing the specific optical configuration of a light source system according to the first embodiment of the present invention.

Next, a specific configuration example of the optical system of the light source section 17 is mainly shown by FIG. 2. FIG. 2 is a view expressing the configuration of the periphery of the light source section 17 in the plane layout.

For example, three semiconductor lasers 20A, 20B, and 20C having the same light-emitting characteristics are provided. The laser light of each of these semiconductor lasers 20A, 20B, and 20C is blue and, for example, the emission wavelength is about 450 nm.

The blue light oscillated by each of these semiconductor lasers 20A, 20B, and 20C is transmitted through each of lenses 41A to 41C, reflected from each of mirrors 22A to 22C, further transmitted through lenses 42 and 43, is thereafter transmitted through the dichroic mirror 23, then is transmitted through a lens group 44, and is then applied to the color wheel 24.

Figure 3:
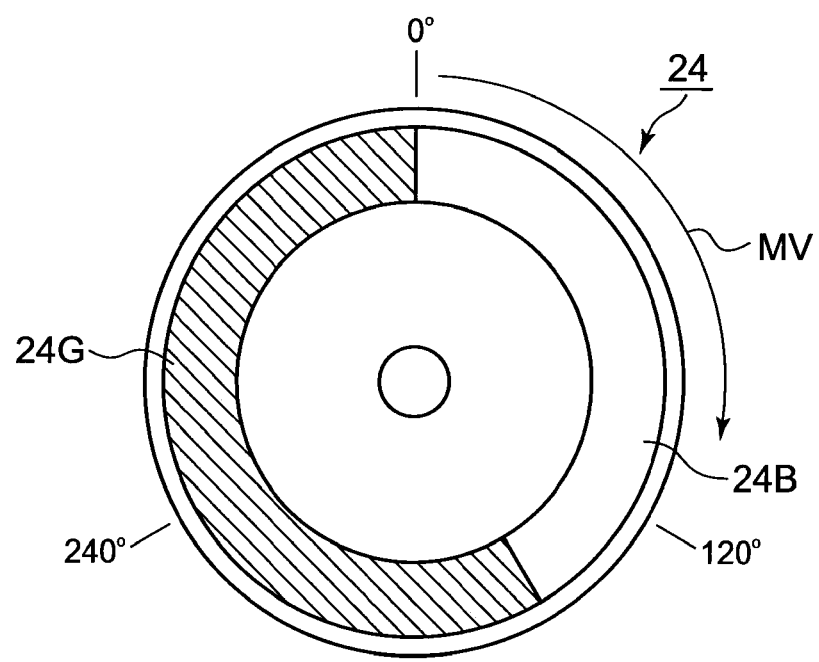
FIG. 3 is a plan view showing the configuration of a color wheel according to the first embodiment of the present invention.

FIG. 3 shows the configuration of the color wheel 24 of this embodiment. On the color wheel 24 in FIG. 3, the arcuate blue color diffusion plate 24B having, for example, a central angle of about 150°, and arcuate green fluorescent substance reflection plate 24G having a central angle of about 210° jointly form one ring.

In this embodiment, the central angle of the blue color diffusion plate 24B is set at, for example, about 150° as an angle larger than 120° corresponding to one third of the entire periphery 360°, and is smaller than 240° corresponding to two thirds of 360°. As a result of this, the green fluorescent substance reflection plate 24G is set such that the central angle thereof has the remaining angle of about 210°. By such angle setting, it becomes possible to cope with the case where the time width of each of the red, green, and blue fields constituting one image frame to be described later is varied.

In FIG. 3, the reference position of the color wheel 24 is set at the position of 0° in FIG. 3. It is shown that the position to which the blue light from each of the semiconductor lasers 20A, 20B, and 20C is applied is moved along the circumference constituted of the blue color diffusion plate 24B and green fluorescent substance reflection plate 24G as indicated by an arrow MV.

When the blue color diffusion plate 24B is located at the irradiation position of the blue light from each of the semiconductor lasers 20A, 20B, and 20C, the applied blue light is transmitted through the color wheel 24 while being diffused by the diffusion plate 24B, is then transmitted through a lens 50 present on the back side, and is reflected from the mirror 26.

Further, the blue light is transmitted through a lens 51, is then reflected from the mirror 27, is transmitted through a lens 52, is thereafter transmitted through the dichroic mirror 28, is transmitted through a lens 46, and is then sent to the integrator 29. The blue light is formed into a light flux having substantially uniform luminance distribution by the integrator 29, is thereafter transmitted through a lens 47, is then reflected from the mirror 30, is then transmitted through a lens 48, and is then sent to the mirror 18 described above.

The blue light reflected from the mirror 18 is transmitted through a lens 49, and is applied to the micromirror element 16. Further, the light figure of the blue color component formed by the micromirror element is transmitted through the lens 49, and projection lens unit 19 described above, and is then projected on the outside.

On the other hand, when the green fluorescent substance reflection plate 24G is located at the irradiation position of the blue light from each of the semiconductor lasers 20A, 20B, and 20C, green light of a wavelength range centering on, for example, the wavelength of about 530 nm is excited. The excited green light is reflected directly or from the color wheel 24, is thereafter transmitted through the lens group 44, and is then reflected from the dichroic mirror 23.

The green light reflected from the dichroic mirror 23 is transmitted through a lens 45, is further reflected from the dichroic mirror 28, is transmitted through the lens 46, and is sent to the integrator 29. The green light is formed into a light flux having substantially uniform luminance distribution by the integrator 29, is thereafter transmitted through the lens 47, is then reflected from the mirror 30, is then transmitted through the lens 48, and is then sent to the mirror 18 described above.

The green light reflected from the mirror 18 is transmitted through the lens 49, and is applied to the micromirror element 16. Further, the light figure of the green color component formed by the micromirror element is transmitted through the lens 49, and projection lens unit 19 described above, and is then projected on the outside.

Further, the LED 21 generates red light of a wavelength of, for example, 620 nm. The red light emitted from the LED 21 is transmitted through a lens group 53, is then transmitted through the dichroic mirror 23, is thereafter transmitted through the lens 45, is then reflected from the dichroic mirror 28, is further transmitted through the lens 46, and is sent to the integrator 29. The red light is formed into a light flux having substantially uniform luminance distribution by the integrator 29, is thereafter transmitted through the lens 47, is reflected from the mirror 30, is then transmitted through the lens 48, and is then sent to the mirror 18 described above.

The red light reflected from the mirror 18 is transmitted through the lens 49, and is applied to the micromirror element 16. Further, the light figure of the red color component formed by the micromirror element is transmitted through the lens 49, and projection lens unit 19 described above, and is then projected on the outside.

Next, an operation of the embodiment described above will be described below.

Here, the period in which each of the primary-color images of blue, red, and green constituting one frame of the color image to be projected is projected (hereinafter respectively referred to as the blue field, red field, and green field) is equally divided into three parts, and the time ratio is set at 1:1:1.

That is, with respect to one rotation angle 360° of the color wheel 24 rotating at a constant speed, the time ratio B:R:G of the blue field, red field, and green field becomes 120°:120°: 120° in terms of the central angles of the color wheel 24.

Figure 4:
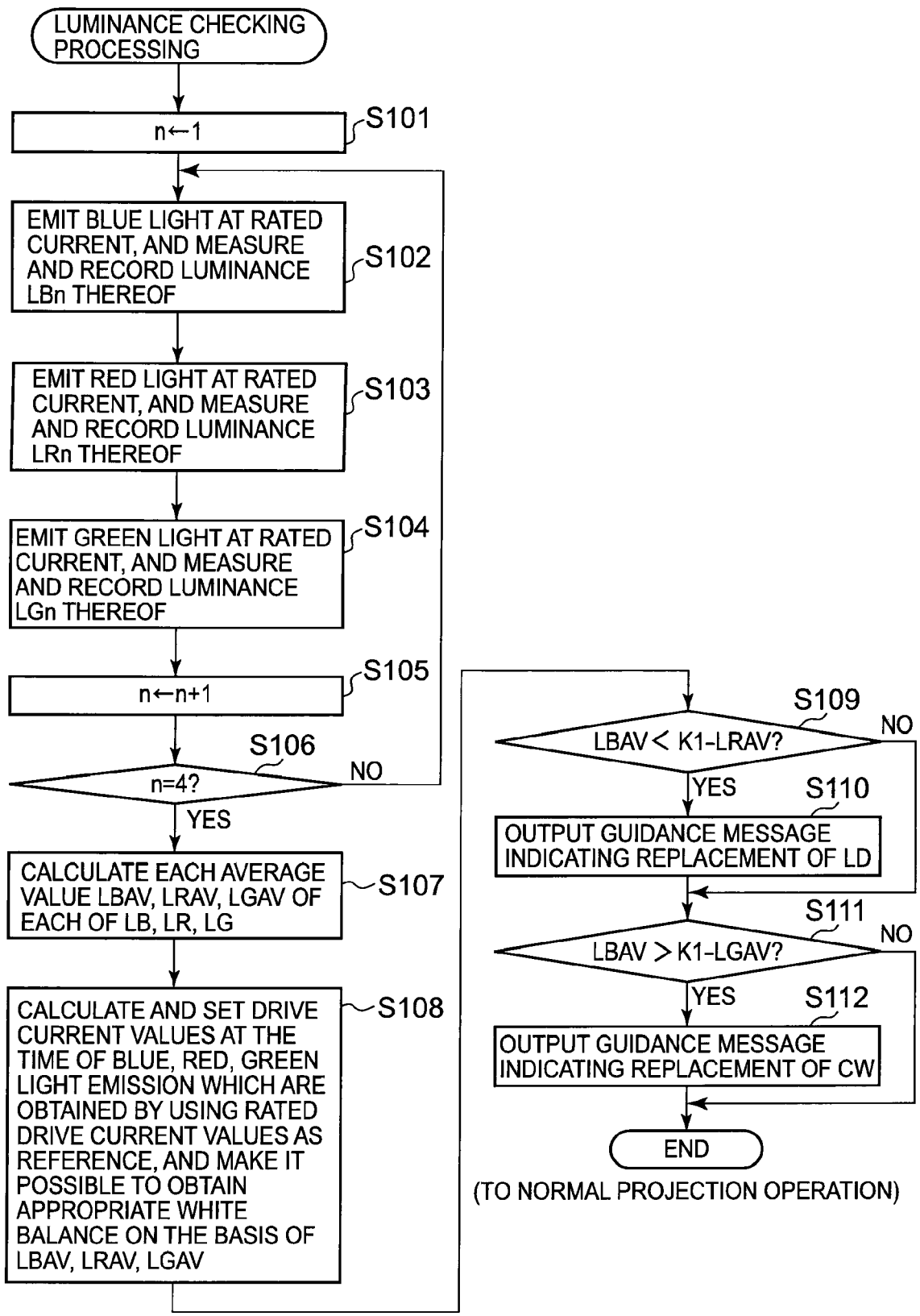
FIG. 4 is a flowchart showing the contents of luminance checking processing of a light source to be executed at the time of a projection operation according to the first embodiment of the present invention.

FIG. 4 is a flowchart showing the contents of the luminance checking processing of the light source section 17 to be executed at the beginning of the turning on of the power of the data projector apparatus 10.

The luminance checking processing may also be automatically executed not only at the beginning of the turning on of the power, but also when the user manually selects the luminance checking processing for the data projector apparatus 10, and when the projection operation is continued for a given time, for example, ten hours.

The processing of FIG. 4 is executed after the operation program stored in the program memory 34 is read by the CPU 32, and is expanded on the main memory 33.

At the beginning of the processing, the CPU 32 sets an initial value "1" in the variable n which is the number of measurement times (step S101).

Further, the first measurement is carried out. In the blue field, each of the semiconductor lasers 20A, 20B, and 20C is made to emit light at the rated current. The luminance LBn (LB1) at that time on the output side of the integrator 29 is measured by the light sensor LS, and the measured data is recorded (step S102).

Here, the value of the rated current made to flow through each of the semiconductor lasers 20A, 20B, and 20C is set by being read from the program memory 34, and is a current value which has been required to emit the blue light in the initial state where the white balance has been obtained at the time of shipment from the factory as described previously.

Further, in the subsequent red field, the LED 21 is made to emit light at the rated current, the luminance LRn (LR1) on the output side of the integrator 29 is measured by the light sensor LS, and the measured data is recorded (step S103).

Here, the value of the rated current made to flow through the LED 21 is also set by being read from the program memory 34, and is a current value which has been required to emit the red light in the initial state where the white balance has been obtained at the time of shipment from the factory as described previously.

Furthermore, in the subsequent green field, each of the semiconductor lasers 20A, 20B, and 20C is made to emit light at the rated current, the luminance LGn (LG1) at that time on the output side of the integrator 29 is measured by the light sensor LS, and the measured data is recorded (step S104).

Here, the value of the rated current made to flow through each of the semiconductor laser 20A, 20B, and 20C is also set by being read from the program memory 34, and is a current value which has been required to emit the green light in the initial state where the white balance has been obtained at the time of shipment from the factory as described previously.

Further, the variable n which is the number of measurement times is updated and set by adding 1 thereto ("+1" update setting) (step S105). After confirming that the value of the update-set variable is not "4" (step S106), the flow is returned to the processing from step S102.

Thus, each of luminance values (LB1, LR1, LG1, LB2, LR2, LG2, LB3, LR3, and LG3) is measured in sequence in the total of three frames of the blue field, red field, and green field.

Figure 5:
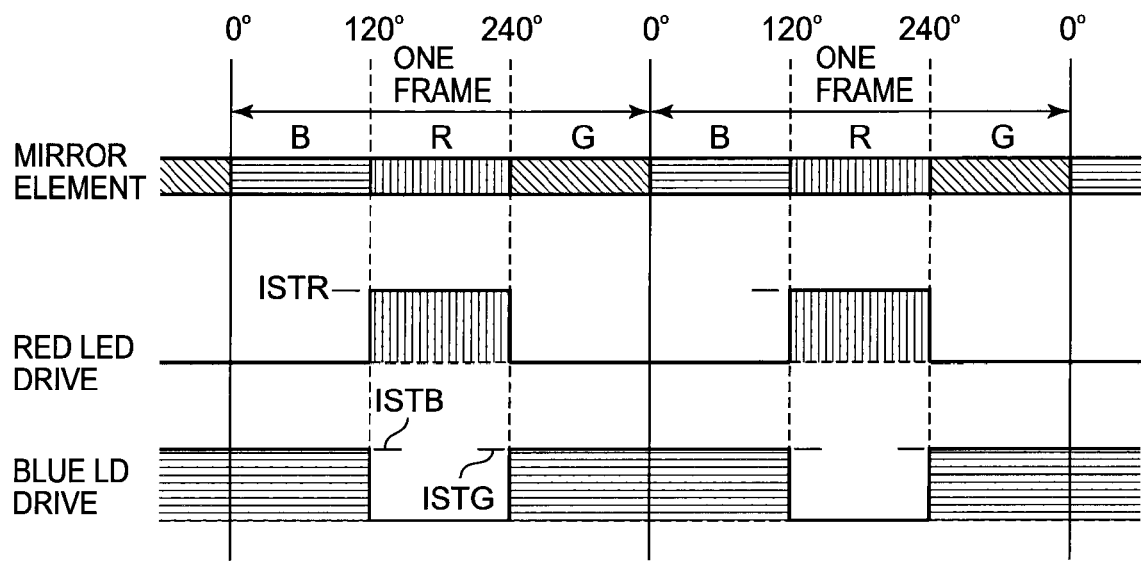
FIG. 5 is a view showing a drive timing of a light source system according to the first embodiment of the present invention.

FIG. 5 is a view showing the drive state of the light source section 17 at the time of execution of the luminance checking processing.

The mirror element of FIG. 5 indicates the color of the light-source light with which the micromirror element 16 is irradiated. As described above, one color image frame is controlled such that the light figure of each color is formed for the same period in each of the blue field, red field, and green field which are equal to each other in terms of time.

Further, red LED drive of FIG. 5 indicates the drive current of the LED 21, and blue LD drive FIG. 5 shows the drive current of each of the semiconductor lasers (blue LD) 20A, 20B, and 20C. In the blue field at the beginning of the frame, the rated drive current ISTB for the blue image is given to each of the semiconductor lasers 20A, 20B, and 20C and, as described above, the luminance LBn (LB1 to LB3) on the output side of the integrator 29 at that time point is measured.

Likewise, in the red field, the rated drive current ISTR for the red image is given to the LED 21 and, as described above, the luminance LRn (LR1 to LR3) on the output side of the integrator 29 at that time point is measured.

Furthermore, in the green field, the rated drive current ISTG for the green image is given to each of the semiconductor lasers 20A, 20B, and 20C and, as described above, the luminance LGn (LG1 to LG3) on the output side of the integrator 29 at that time point is measured.

It should be noted that in FIG. 5, although the state where the rated drive current ISTB for the blue image to be given to each of the semiconductor lasers 20A, 20B, and 20C, and rated drive current ISTG for the green image are equal to each other is shown, in the state where the white balance is obtained at the time of shipment from the factory, depending on the fluorescence characteristics or the like of the green fluorescent substance reflection plate 24G, the rated drive current ISTB for the blue image, and rated drive current ISTG for the green image may be previously different from each other.

As described above, the luminance values are measured for three frames, thereafter in step S105, the variable n is increased by 1 to thereby update and set the variable n at "4", and then in the subsequent step S106, the above fact is confirmed to temporarily stop the measurement of the luminance.

Subsequently, the average value LBAV, LRAV or LGAV of each luminance LB, LR or LG of the case of the drive by the rated current is obtained from the measurement values for the three frames (step S107).

On the basis of the obtained average luminance values LBAV, LRAV, and LGAV, the drive current values IB1, IR1, and IG1 in the blue field, red field, and green field which are obtained by using the rated drive current values ISTB, ISTR, and ISTG as the reference, and which make it possible to obtain the optimum white balance are calculated and set (step S108).

More specifically, by using the light source color in which the lowering rate of the luminance is the most conspicuous as the reference, the drive current values of the other two light source colors that enable the white balance at the time of shipment from the factory to be obtained are calculated, and adjustment of the drive current values is carried out.

Figure 6:
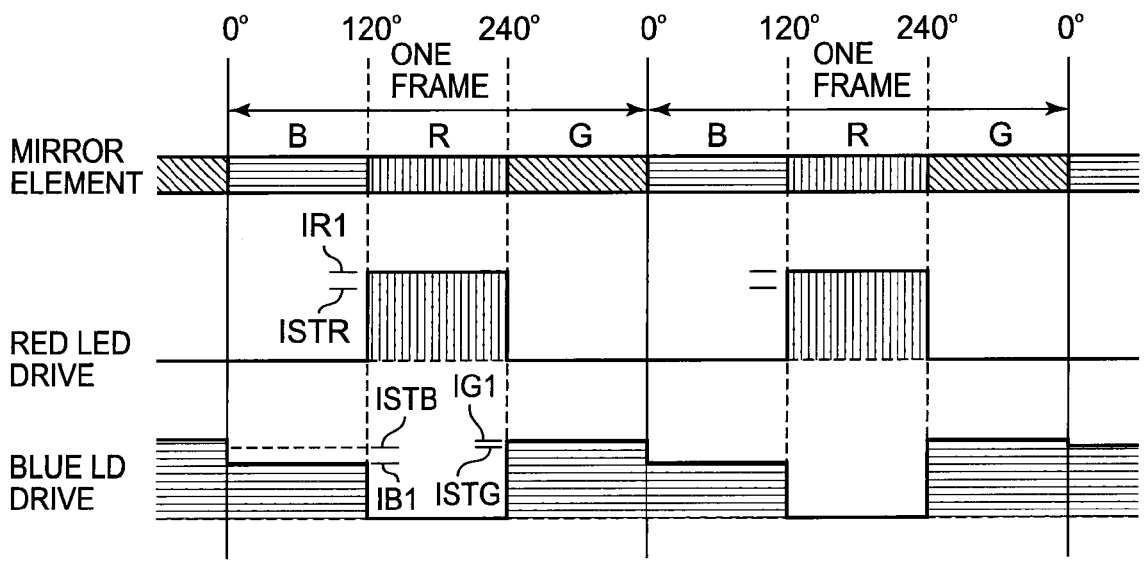
FIG. 6 is a view showing a drive timing of a light source system according to the first embodiment of the present invention.

FIG. 6 is a view showing the drive state of the light source section 17 of the case where the new drive current values are thus set.

The mirror element of FIG. 6 indicates the colors of the light-source light with which the micromirror element 16 is irradiated.

Further, red LED drive of FIG. 6 indicates the drive current of the LED 21, and blue LD drive of FIG. 6 indicates the drive current of each of the semiconductor lasers (blue LD) 20A, 20B, and 20C. In the blue field at the beginning of the frame, the drive current IB1 lower than the rated drive current ISTB for the blue color image is given to each of the semiconductor lasers 20A, 20B, and 20C.

In the subsequent red field, the drive current IR1 higher than the rated drive current ISTR for the red image is given to the LED 21. In the green field subsequent to the red field, the drive current IG1 higher than the rated drive current ISTG for the green image is given to each of the semiconductor lasers 20A, 20B, and 20C.

Here, as what makes the lowering rate of the emission luminance of the LED 21 the most conspicuous, the drive current LR1 of the LED 21 is set at a value largely higher than the rated drive current ISTR. An example in which the drive current IG1 for the green image to be given to each of the semiconductor lasers 20A, 20B, and 20C is set at a value a little higher than the rated drive current ISTG, and at the same time, the drive current IB1 for the blue image to be given to each of the semiconductor lasers 20A, 20B, and 20C is set at a value conversely lower than the rated drive current ISTB so that the appropriate white balance can be obtained for the new emission luminance of the red light is shown.

Thus, measurement of the luminance based on the drive using the rated drive current, and setting of the new drive current which makes it possible to obtain the optimum white balance and which is obtained on the basis of the measurement result by taking the deterioration of each color into consideration are carried out, whereby preparation for the normal projection operation is completed.

Furthermore, here the deterioration judgment of the semiconductor lasers 20A, 20B, and 20C, and LED 21 constituting the elements of the light source section 17 is carried out on the basis of the calculated average luminance value.

That is, determination is made according to whether or not the average luminance LBAV of the case where each of the semiconductor lasers 20A, 20B, and 20C is driven by the rated current for the blue image is lower than the value obtained by multiplying the average luminance LRAV of the case where the LED 21 is driven by the rated current for the red image by a predetermined coefficient K1. When it is determined that the former is lower than the latter, it is possible to determine that any one of the semiconductor lasers 20A, 20B, and 20C is deteriorated to be lower than the practical limit (step S109).

Here, the coefficient K1 is a coefficient recorded in advance on the program memory 34 according to the luminance characteristics of the blue light emitted from each of the semiconductor lasers 20A, 20B, and 20C at the time of the product shipment, transmission characteristics of the blue color diffusion plate 24B of the color wheel 24, and luminance characteristics of the red light emitted from the LED 21.

By using the average luminance LRAV of the case where the LED 21 is driven by the rated current for the red image as the comparison object, not the average luminance LGAV of the case where each of the semiconductor lasers 20A, 20B, and 20C is driven by the rated current for the green image, but the average luminance LBAV of the case where each of the semiconductor lasers 20A, 20B, and 20C is driven by the rated current for the blue image is compared with the above comparison object. This is because in the case of the green color, there is the strong possibility of the fluorescent substance applied to the green fluorescent substance reflection plate 24G of the color wheel 24 being deteriorated in addition to the deterioration of the semiconductor lasers 20A, 20B, and 20C, whereas in the case of the blue color, it is practically hard to conceive that the blue color diffusion plate 24B part of the color wheel 24 is deteriorated in addition to the deterioration of the semiconductor lasers 20A, 20B, and 20C.

When it is determined in step S109 that the semiconductor lasers 20A, 20B, and 20C are deteriorated to be lower than the predetermined value, a guidance message indicating that the semiconductor lasers 20A, 20B, and 20C or the assembly unit of the light source section 17 should be replaced is output as a projection image (step S110).

Subsequently, determination is made according to whether or not the average luminance LBAV of the case where each of the semiconductor lasers 20A, 20B, and 20C is driven by the rated current for the blue image is higher than the value obtained by multiplying the average luminance LGAV of the case where each of the semiconductor lasers 20A, 20B, and 20C is driven by the rated current for the green image by a predetermined coefficient K2. When it is determined that the former is higher than the latter, it is possible to determine that the fluorescent substance applied to the green fluorescent substance reflection plate 24G part of the color wheel 24 is deteriorated to be lower than the practical limit (step S111).

Here, the coefficient K2 is a coefficient recorded in advance on the program memory 34 according to the luminance characteristics of the blue light emitted from each of the semiconductor lasers 20A, 20B, and 20C at the time of the product shipment, transmission characteristics of the blue color diffusion plate 24B of the color wheel 24, and fluorescence characteristics of the fluorescent substance applied to the green fluorescent substance reflection plate 24G of the color wheel 24.

When it is determined in step S111 that the green fluorescent substance reflection plate 24G is deteriorated to be lower than the predetermined value, a guidance message indicating that the color wheel 24 or the assembly unit of the light source section 17 should be replaced is output as a projection image (step S112).

After the luminance checking processing of FIG. 4 is thus completed, the flow is moved to the normal projection operation.

According to this embodiment described above in detail, when a plurality of light source elements or fluorescent substances constituting the light source section 17 are used, even if aged deterioration occurs in the individual elements, and the like, it becomes possible, by compensating the deterioration, to make the color reproducibility and luminosity of the projected image compatible with each other for a long time.

It should be noted that in the embodiment described above, the light sensor LS is arranged on the output side of the integrator 29, and the emission intensity of each of the blue light, red light, and green light is detected by one light sensor LS.

As a result of this, it becomes possible to detect the required emission intensity of the light of all the colors while simplifying the configuration of the necessary circuit elements to the utmost, and it is further possible to keep an increase in the manufacturing cost of the overall apparatus down to the minimum.

Further, in the embodiment described above, on the basis of the result of the luminance checking, the emission intensity of the light emission element on the light source side is variably adjusted without changing the time width of each of the fields of R, G, and blue constituting one frame.

As a result of this, it is not necessary to change the operation timing in the circuit on the light figure forming side including the projection image processing section 15 and micromirror element 16, and the control is facilitated.

It should be noted that in the processing of FIG. 4, it is determined whether or not the emission luminance of any one of the semiconductor lasers 20A, 20B, and 20C is deteriorated to be lower than the practical limit according to whether or not the value of the emission luminance of each of the semiconductor lasers 20A, 20B, and 20C is lower than the predetermined percentage as compared with the emission luminance of the LED 21 in step S109. However, when the LED 21 is deteriorated together with the semiconductor lasers 20A, 20B, and 20C, it is not possible to detect the deterioration of these elements by the determination processing shown in step S109 described above.

Accordingly, the luminance of each of the LED 21, and semiconductor lasers 20A, 20B, and 20C may be measured, and the absolute value thereof may be compared with the primary luminance. By adding such processing, it is possible to correctly determine the luminance deterioration of each of the LED 21, and semiconductor lasers 20A, 20B, and 20C. Further, when any one of the semiconductor lasers, LED 21, and fluorescent substance applied to the green fluorescent substance reflection plate 24G part is deteriorated to be lower than the predetermined value, it is possible to notify the replacement instruction or the like.

It should be noted that the time width of each of the field periods of R, G, and blue constituting one frame may be changed while keeping the light emission power of each of the light emission elements constant without variably adjusting the emission intensity by controlling the drive current of the light emission element on the light source side as shown in FIG. 6.

Figure 7:
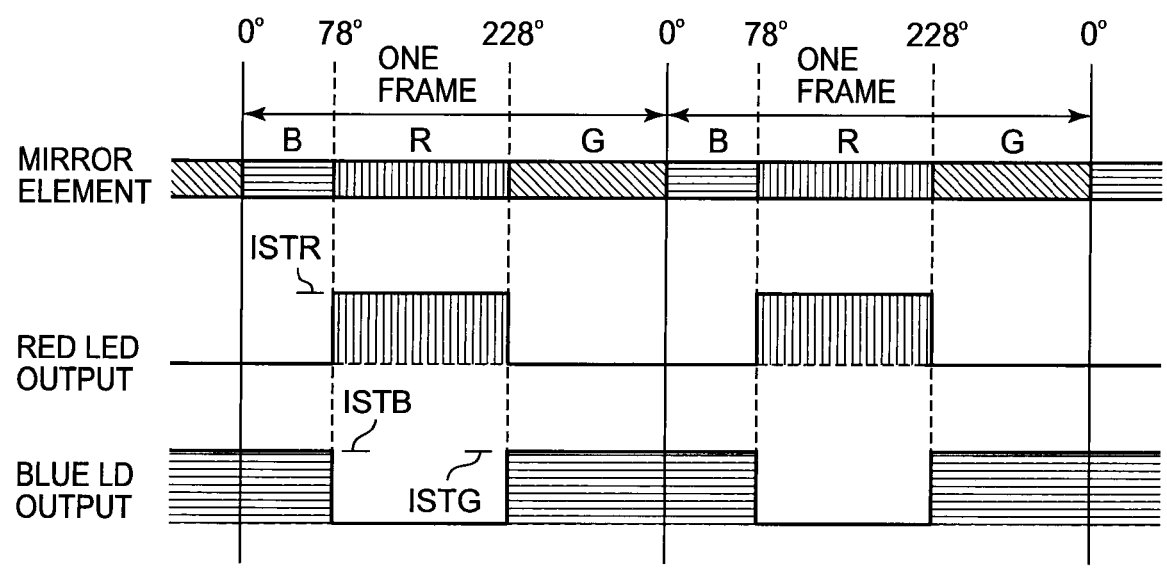
FIG. 7 is a view showing a drive timing of a light source system according to the first embodiment of the present invention.

FIG. 7 shows a drive example of the light source section 17 of the case where setting is so made as to allow the time width of each of the field periods of R, G, and blue constituting one frame to be changed in place of the processing in step S108 described above.

Here, although after the luminance checking processing too, as in the state described in connection with FIG. 5, the drive of both the semiconductor lasers 20A, 20B, and 20C, and LED 21 at the rated currents ISTB, ISTR, and ISTG is continued, the time width of each of the fields is largely changed.

That is, in the blue field, the time width is largely reduced from that corresponding to 120° in terms of the central angle of the rotating color wheel 24 to a time width corresponding to 78°. In the subsequent red field, the time width is largely increased from that corresponding to 120° in terms of the central angle of the rotating color wheel 24 to a time width corresponding to 150°. In the subsequent green field, the time width is somewhat increased from that corresponding to 120° in terms of the central angle of the rotating color wheel 24 to a time width corresponding to 132°.

It is necessary for the CPU 32 to cause the projection light processing section 31 to control the drive current and drive timing of each of the semiconductor lasers 20A, 20B, and 20C, and LED 21 in the manner described above and, at the same time, synchronize the timing of forming the light figure in the projection system including the projection image processing section 15 and micromirror element 16 with the adjustment contents of the light-source light described above.

As described above, the time width of the field is adjusted for each of the fields constituting the one frame while each of the light emission elements is driven by constant electrical power without adjusting the emission intensity by the electrical power used to drive each of the elements of the light source. As a result of this, the time control on the image projection side becomes complicated and, on the other hand, each of the light emission elements is driven by constant electrical power at all times, and hence there is no possibility of the deterioration of the light emission element being accelerated, and it is possible to prolong the life of the light emission element.

It should be noted that in the embodiment described above, it has been described that by providing the light sensor on the output side of the integrator 29, the emission intensity of each of the colors of B, R, and green can be detected. However, when deterioration of the emission intensity of one of the semiconductor laser (20A, 20B or 20C) on one side, and LED 21 on the other side which are light emission elements is more conspicuous than the other due to the design condition of the apparatus or the characteristics of the light emission element, or when it is conceivable that one of them is more liable to be deteriorated than the other, the light sensor LS may be arranged in direct opposition to the light emission part of the light emission element.

Further, in the embodiment described above, it has been described that one of the semiconductor laser (20A, 20B or 20C), and LED 21 is selectively driven, whereby one color image frame is made up of the blue field, red field, and green field based on the blue light, red light, and green light. However, the present invention is not limited to this, and a plurality of light emission elements may be simultaneously made to emit light, and the image field formed by the mixture of colors may be included.

Furthermore, a yellow fluorescent substance reflection plate may be provided in addition to the green fluorescent substance reflection plate 24G.

More specifically, for example, by causing the blue light and red light to be simultaneously emitted, an image field configured to project an M (magenta) light figure may exist in one image frame by the color mixture. Furthermore, by causing the green light and red light to be simultaneously emitted, an image field configured to project a Y (yellow) light figure may exist in one image frame by the color mixture.

By providing an image field resulting from color mixture, it is possible to further increase the expressivity of the color, and luminosity of the image, and consequently it is possible to carry out projection suitable for the environment in which the data projector apparatus 10 is used.

It should be noted in the embodiment described above, although the blue light is obtained by the configuration based on the semiconductor laser 20 configured to emit blue laser light, and blue color diffusion plate 24B, the configuration based on the semiconductor laser configured to emit ultraviolet laser light, and blue fluorescent substance reflection plate may also be employed.

Further, although the blue light is obtained by the configuration based on the semiconductor laser 20 configured to emit blue laser light, and green fluorescent substance reflection plate 24G, the configuration based on the semiconductor laser configured to emit ultraviolet laser light, and green fluorescent substance reflection plate 24G may also be employed.

Furthermore, although the red light is obtained by using the LED 21 emitting red light, the configuration in which a semiconductor laser emitting red laser light is used may also be employed.

Second Embodiment

A second embodiment of a case where the present invention is applied to a data projector apparatus of the DLP (registered trade name) system will be described below with reference to the drawings.

Figure 8:
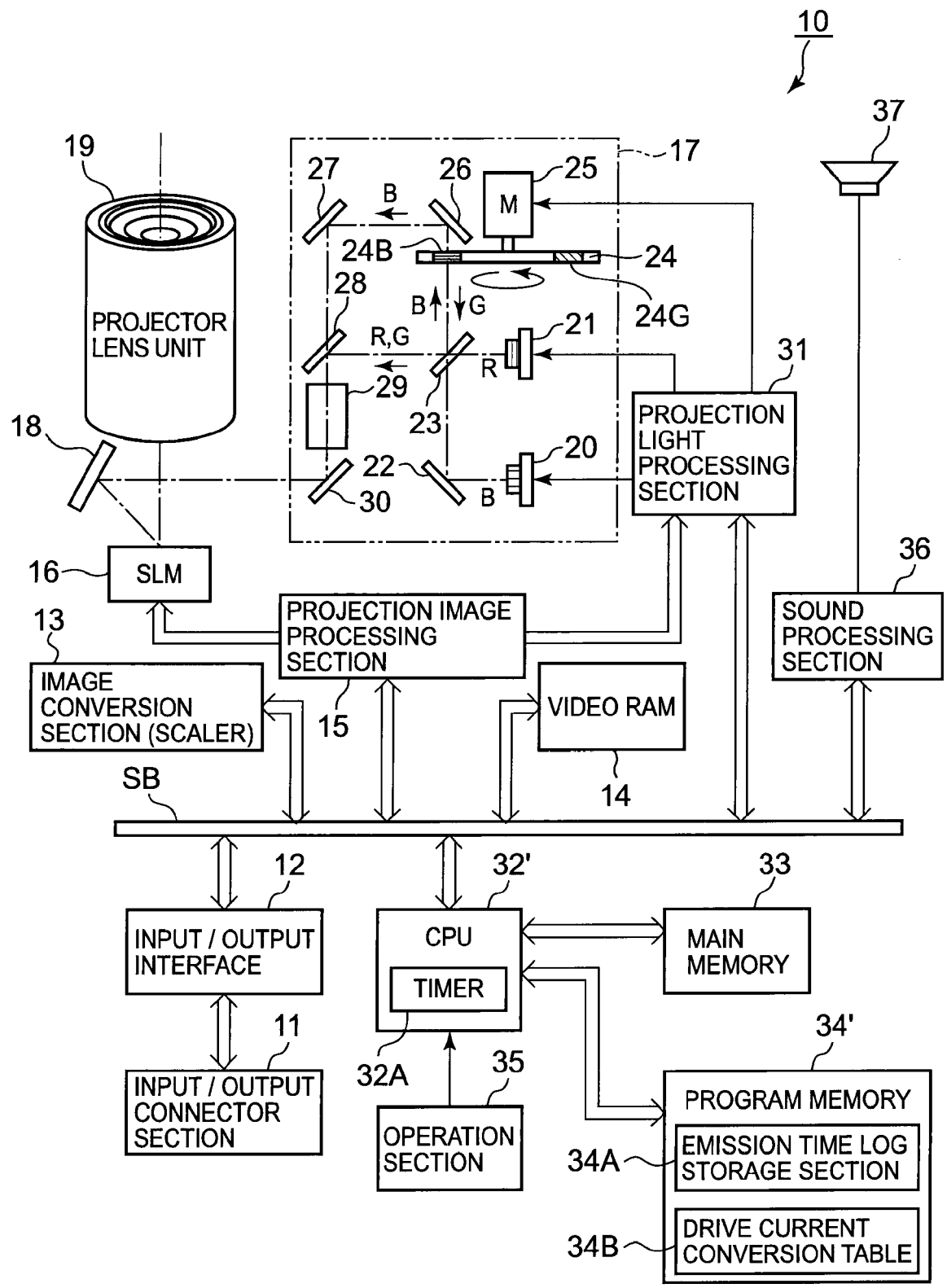
FIG. 8 is a block diagram showing the functional circuit configuration of an overall data projector apparatus according to a second embodiment of the present invention.

FIG. 8 is a block diagram showing the schematic functional configuration of an electronic circuit provided in a data projector apparatus 10' according to this embodiment.

It should be noted that the fundamental electronic circuit constituting the data projector apparatus 10', and particularly the specific configuration example of the optical system of a light source section 17 are substantially identical with the contents shown in FIGS. 1 and 2 described above, and hence identical parts are denoted by identical reference symbols, and a description of them will be omitted.

It should be noted that the second embodiment differs from the first embodiment in the point that the light source section 17 includes no light sensor LS shown in FIGS. 1 and 2.

Further, a CPU 32' used in place of the CPU 32 is provided with a timer 32A configured to count the light emission time inside.

Furthermore, a program memory 34' used in place of the program memory 34 is provided with an emission time log storage section 34A and drive current conversion table 34B. The emission time log storage section 34A holds the accumulated light emission time of each of semiconductor lasers 20A, 20B, and 20C, and an LED 21. The drive current conversion table 34B previously stores therein a reference drive current value corresponding to the accumulated light emission time of each of the semiconductor lasers 20A, 20B, and 20C, and LED 21 in the form of a look-up table. The storage contents of the drive current conversion table 34B are the reference drive current values each of which is used to obtain the necessary emission luminance from the aged deterioration characteristics of each of the semiconductor lasers 20A, 20B, and 20C, and LED 21, and is stored as a predicted value.

Next, an operation of the above embodiment will be described below.

It should be noted that in this embodiment, it is assumed that the data projector apparatus 10' can select one of a plurality of color projection modes, e.g., a normal mode, presentation mode, theater mode, graphics mode, and blackboard mode.

The normal mode is used as a criterion of the color projection mode of this data projector apparatus 10', and setting in which importance is attached to color representation is carried out in this mode.

In the presentation mode, setting which is suitable for the ordinary presentation at a bright place and in which importance is attached to brightness is carried out.

In the theater mode, setting in which importance is attached to expression of a dark part of a movie is carried out.

In the graphics mode, setting in which importance is attached to gradation expression in order that a photograph or the like can be seen natural is carried out.

In the blackboard mode, setting which enables the projected contents to be clearly recognized even when an image is projected on a blackboard is carried out.

Regarding these color modes other than the normal mode, it is assumed that projection time conversion coefficients based on the differences between the drive current values of the semiconductor lasers 20A, 20B, and 20C, and LED 21, and determined by using the normal mode as the criterion are stored in advance in the program memory 34'.

Figure 9:
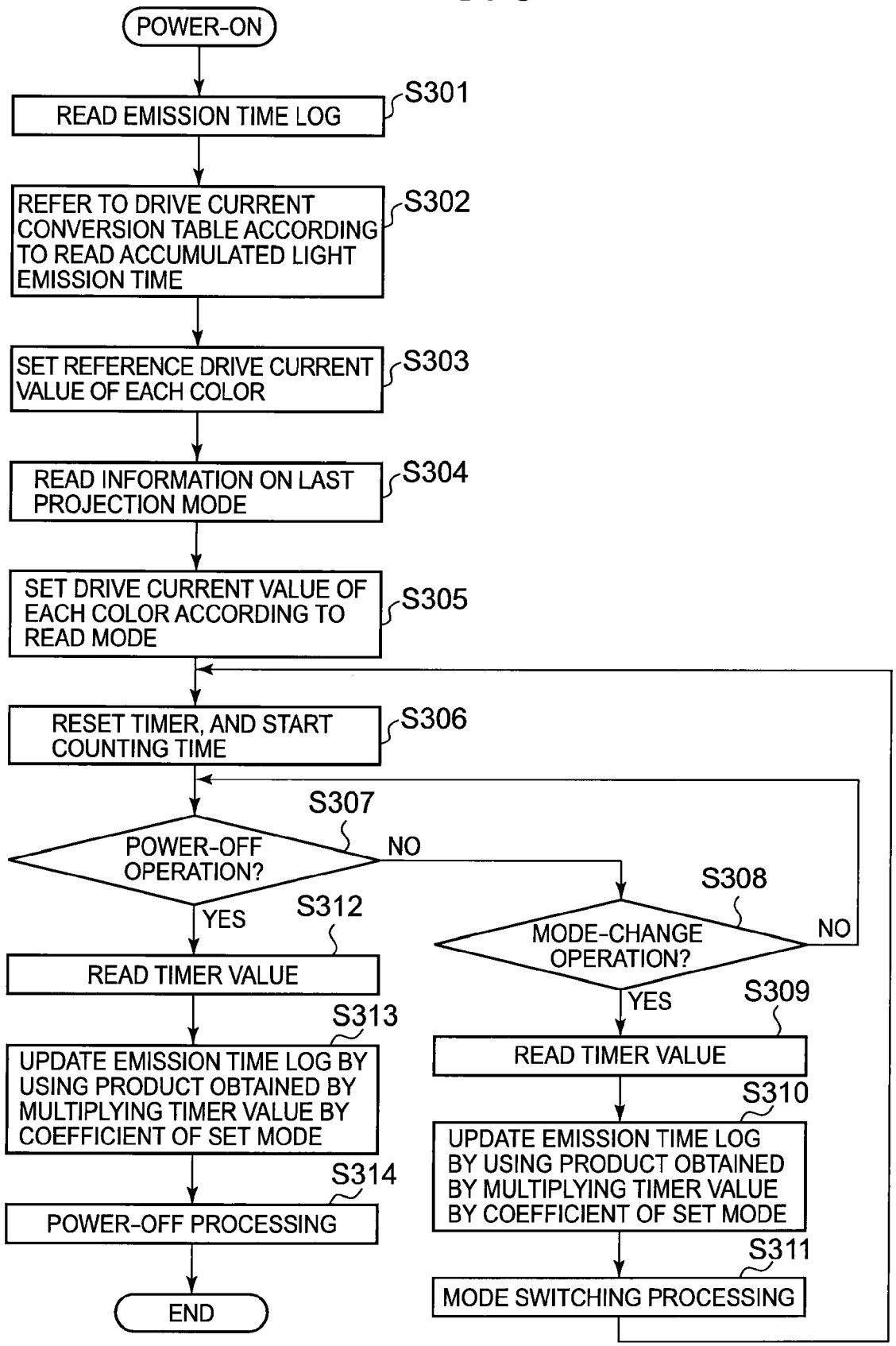
FIG. 9 is a flowchart showing the contents of drive control processing to be executed in parallel at the time of a projection operation according to the second embodiment of the present invention.

FIG. 9 shows the processing contents of the drive control of the light source section 17 to be carried out in parallel with the projection operation after turning on the power of the data projector apparatus 10'. In this processing of FIG. 9, the CPU 32' reads the operation program stored in the program memory 34', expands the read operation program on the main memory 33, and thereafter executes the operation program.

At first, the CPU 32' reads the accumulated light emission time of each of the semiconductor lasers 20A, 20B, and 20C, and an LED 21 from the emission time log storage section 34A (step S301).

Further, the CPU 32' refers to the drive current conversion table 34B according to the read accumulated light emission time, and reads the reference drive current value of each of the semiconductor lasers 20A, 20B, and 20C, and LED 21 (step S302).

The CPU 32' sets the reference drive current value of each of the light emission elements in a projection light processing section 31 (step S303). Thereafter, the CPU 32' further reads the information on the color projection mode set at the time point at which the power has been turned off last time from the program memory 34' (step S304).

On the basis of the read information on the color projection mode, the above set reference drive current value is multiplied by the ratio of the drive current at the time of emission of each of the blue light and green light by the semiconductor lasers 20A, 20B, and 20C, and ratio of the drive current at the time of emission of the red light by the LED 21, and the resultant product is set in the projection light processing section 31 as a new drive current value (step S305).

Furthermore, the CPU 32' resets the timer provided inside the CPU 32' to start counting of the projection time (step S306).

Thereafter, the CPU 32' executes the projection operation in the set color projection mode in parallel with the counting of the projection time. During the execution of the projection operation, the CPU 32' also waits for both the operation of confirming whether or not an operation of the power-off key has been carried out by using the operation section 35 (step S307), and operation of confirming whether or not an operation of issuing an instruction to change the color projection mode has been carried out (step S308) to be carried out.

When the operation of issuing an instruction to change the color projection mode is carried out in the middle of the projection operation, determination of the fact is carried out in step S308 described above, and the counted time value of the timer 32A at that time is read (step S309).

Subsequently, the light emission time of each of the semiconductor lasers 20A, 20B, and 20C, and LED 21 converted into the value at the normal mode time is calculated on the basis of the read counted time value, and color projection mode which has been set before that time, and the contents of the emission time log storage section 34A is updated/set by using the calculated light emission time (step S310).

Subsequently, after the processing of switching the mode to the new color projection mode is executed in accordance with the above instruction operation (step S311), the flow is returned to the processing from step S306 described above again.

Further, when it is determined in above step S307 that an operation of issuing an instruction to turn off the power has been carried out, the counted time value of the timer 32A at that time is read (step S312).

Subsequently, the light emission time of each of the semiconductor lasers 20A, 20B, and 20C, and LED 21 converted into the value at the normal mode time is calculated on the basis of the read counted time value, and color projection mode which has been set before that time, and the contents of the emission time log storage section 34A is updated/set by using the calculated light emission time (step S313).

Subsequently, after the processing of turning off the power of the data projector apparatus 10' including the aftercooling processing is executed in accordance with the above instruction operation (step S314), the processing of FIG. 9 is terminated.

As has been described above in detail, according to this embodiment, it becomes possible, when a plurality of light sources or fluorescent substances are used, and the degree of the aged deterioration of the light emission elements is advanced on the basis of the prediction, even if the aged deterioration occurs in the individual elements or the like, to compensate the deterioration, and make the color reproducibility and luminosity of the projected image compatible with each other for a long time without particularly providing a circuit element such as a sensor or the like configured to directly detect the emission luminance of each of the semiconductor lasers 20A, 20B, and 20C, and LED 21.

Furthermore, in the above embodiment, it is made possible to select one of a plurality of color projection modes, the light emission time of the light emission element in each color projection mode is converted into the value of the one color projection mode used as the criterion, and thereafter the light emission time is accumulated for each light emission element for management.

As a result of this, management of the accumulated light emission time is facilitated and, at the same time, it is possible to establish an accurate management method in which the degree of wear of the plurality of light emission elements is taken into consideration.

It should be noted that in each of the first and second embodiments described above, it has been described that the blue laser light is oscillated by each of the semiconductor lasers 20A, 20B, and 20C, and blue light and green light are generated by means of the color wheel 24, on the other hand, the red light is generated by using the LED 21. However, the present invention is not limited to the above, and can be equally applied to a light source section in which a plurality of types of light sources are used, and when the luminance balance of the primary color light that can be generated by one light source is unsuited for practical use, the unsuited luminance balance is compensated by using another light source, and projector apparatus employing such a light source section.

Further, although in each of the above embodiments, the case where the present invention is applied to a data projector apparatus of the DLP (registered trade name) system has been described, the present invention can be equally applied to, for example, a liquid crystal projector or the like configured to form a light figure by using a transmissive monochrome liquid crystal panel.

Furthermore, the present invention is not limited to the embodiments described above, and can be variously modified in the implementation stage within the scope not deviating from the gist of the invention. Further, the functions carried out in the embodiments described above may be appropriately combined with each other as much as possible to be implemented. Various stages are included in the embodiments described above, and various inventions can be extracted by appropriately combining a plurality of disclosed constituent elements. For example, even when some constituent elements are deleted from all the constituent elements shown in the embodiments, if an advantage can be obtained, the configuration from which the constituent elements have been deleted can be extracted as an invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A light source device comprising:
a first light source configured to emit light in a first wavelength range;
a light-source light generation section configured to generate light-source light of each of a plurality of colors by using the light emission of the first light source by time division;
a second light source configured to emit light-source light of a second wavelength range different from the first wavelength range;
a first control section configured to control (i) a drive timing of each of the first and second light sources, and (ii) the light-source light generation section such that the light-source light generated from each of the light-source light generation section and the second light source is cyclically generated;
a detection section configured to detect a light intensity of the light-source light generated from each of the light-source light generation section and the second light source;
a storage section configured to store therein (i) light intensity values of the light-source light generated from each of the light-source light generation section and the second light source detected by the detection section, and (ii) a target light intensity ratio; and
a second control section configured to calculate a light intensity ratio of the light-source light detected by the detection section, and to adjust a light emission state of each of the first and second light sources such that the calculated light intensity ratio becomes equal to the target light intensity ratio.

2. The light source device according to claim 1, wherein the second control section further comprises a warning section configured to calculate a difference value between a light intensity value of the light-source light detected by the detection section and a corresponding one of the light-source light intensity values stored in the storage section, and issue a warning based on light-source light with respect to which the difference value is equal to or larger than a predetermined value.

3. The light source device according to claim 1, wherein the second control section adjusts a drive current value of each of the first and second light sources such that the calculated light intensity ratio of the light-source light detected by the detection section becomes equal to the target light intensity ratio.

4. A projection apparatus comprising:
a first light source configured to emit light in a first wavelength range;
a light-source light generation section configured to generate light-source light of each of a plurality of colors by using the light emission of the first light source by time division;
a second light source configured to emit light-source light of a second wavelength range different from the first wavelength range;
a first control section configured to control (i) a drive timing of each of the first and second light sources, and (ii) the light-source light generation section such that the light-source light generated from each of the light-source light generation section and the second light source is cyclically generated;
a detection section configured to detect a light intensity of the light-source light generated from each of the light-source light generation section and the second light source;
a storage section configured to store therein (i) predetermined light intensity values of the light-source light generated from each of the light-source light generation section and the second light source detected by the detection section, and (ii) a target light intensity ratio;
a second control section configured to calculate a light intensity ratio of the light-source light detected by the detection section, and to adjust a light emission state of each of the first and second light sources such that the calculated light intensity ratio becomes equal to the target light intensity ratio;
an input section configured to input an image signal; and
a projection section configured to form a color light figure corresponding to the image signal input by the input section by using the light-source light emitted in accordance with control carried out by each of the first and second light source control sections, and to project the formed color light figure.

5. The projection apparatus according to claim 4, wherein:
the detection section is provided at a position to be irradiated with both the light-source light of each of a plurality of colors generated from the light-source light generation section, and light-source light emitted from the second light source as a common irradiation position, and
the second control section adjusts all the light emission states of the light-source light of each of the plurality of colors generated from the light-source light generation section, and light-source light emitted from the second light source based on the detection results of the detection section.

6. The projection apparatus according to claim 4, wherein the second control section adjusts a light emission intensity of the light-source light emitted from each of the first and second light sources based on the detection results of the detection section.

7. The projection apparatus according to claim 4, wherein the second control section adjusts a light emission time width of the light-source light emitted from each of the first and second light sources based on the detection results of the detection section.

8. The projection apparatus according to claim 4, wherein the second control section calculates a difference value between a light intensity value of the light-source light detected by the detection section and a corresponding one of the light-source light intensity values stored in the storage section, and issues a warning based on light-source light with respect to which the difference value is equal to or larger than a predetermined value.

9. The projection apparatus according to claim 4, wherein:
the first light source emits laser light of a blue wavelength range, and
the light-source light generation section comprises a color wheel in which at least a fluorescent substance layer configured to generate light of a green wavelength range by using the laser light as excitation light, and a diffusion layer configured to diffuse/transmit the laser light are provided in parallel with each other in a circumferential direction.

10. The projection apparatus according to claim 4, wherein the second control section adjusts a drive current value of each of the first and second light sources such that the calculated light intensity ratio of the light-source light detected by the detection section becomes equal to the target light intensity ratio.

11. The projection apparatus according to claim 9, wherein the second control section calculates a difference value between a light intensity value of the light-source light detected by the detection section and a corresponding one of the light-source light intensity values stored in the storage section, and notifies that one of the first light source, the fluorescent substance layer provided on the color wheel, and the second light source is deteriorated based on light-source light with respect to which the difference value is equal to or larger than a predetermined value.

12. The projection apparatus according to claim 9, wherein the second light source comprises a light-emitting diode configured to emit light of a red wavelength range.

13. The projection apparatus according to claim 9, wherein the second light source comprises a laser light source configured to emit light of a red wavelength range.

14. A projection method for a projection apparatus, the projection apparatus including a first light source configured to emit light in a first wavelength range, a light-source light generation section configured to generate light-source light of each of a plurality of colors by using the light emission of the first light source by time division, a second light source configured to emit light-source light of a second wavelength range different from the first wavelength range, a detection section configured to detect a light intensity of the light-source light generated from each of the light-source light generation section and the second light source, a storage section configured to store therein (i) predetermined light intensity values of the light-source light generated from each of the light-source light generation section and the second light source detected by the detection section and (ii) a target light intensity ratio, an input section configured to input an image signal, and a projection section configured to form a color light figure corresponding to the image signal input by the input section by using the light-source light and to project the formed color light figure, the method comprising:

controlling (i) a drive timing of each of the first and second light sources, and (ii) the light-source light generation section such that the light-source light generated from each of the light-source light generation section and the second light source is cyclically generated;

calculating a light intensity ratio of the light-source light detected by the detection section; and adjusting a light emission state of each of the first and second light sources such that the calculated light intensity ratio becomes equal to the target light intensity ratio.

15. The method according to claim 14, wherein the adjusting comprises adjusting a drive current value of each of the first and second light sources such that the calculated light intensity ratio of the light-source light detected by the detection section becomes equal to the target light intensity ratio.

16. A non-transitory computer readable storage medium having a program stored thereon for controlling a projection apparatus, the projection apparatus including a first light source configured to emit light in a first wavelength range, a light-source light generation section configured to generate light-source light of each of a plurality of colors by using the light emission of the first light source by time division, a second light source configured to emit light-source light of a second wavelength range different from the first wavelength range, a detection section configured to detect a light intensity of the light-source light generated from each of the light-source light generation section and the second light source, a storage section configured to store therein (i) predetermined light intensity values of the light-source light generated from each of the light-source light generation section and the second light source detected by the detection section and (ii) a target light intensity ratio, an input section configured to input an image signal, and a projection section configured to form a color light figure corresponding to the image signal input by the input section by using the light-source light and to project the formed color light figure, the program being executable to control the projection apparatus to perform functions comprising:

controlling (i) a drive timing of each of the first and second light sources, and (ii) the light-source light generation section such that the light-source light generated from each of the light-source light generation section and the second light source is cyclically generated;

calculating a light intensity ratio of the light-source light detected by the detection section; and adjusting the light emission state of each of the first and second light sources such that the calculated light intensity ratio becomes equal to the target light intensity ratio.

17. The non-transitory computer readable storage medium according to claim 16, wherein the adjusting comprises adjusting a drive current value of each of the first and second light sources such that the calculated light intensity ratio of the light-source light detected by the detection section becomes equal to the target light intensity ratio.

* * * * *